United States Patent [19]

Duck et al.

[11] Patent Number: 5,064,494
[45] Date of Patent: Nov. 12, 1991

[54] PROCESS FOR THE AT LEAST PARTIAL CURING OF SEALANTS AND ADHESIVES USING PULSED MICROWAVE ENERGY

[75] Inventors: Edward W. Duck, Gaiberg; Ingolf Scheffler, Wiesloch; Michael Hirthammer, Heidelberg, all of Fed. Rep. of Germany

[73] Assignee: Teroson G.M.B.H., Fed. Rep. of Germany

[21] Appl. No.: 334,279
[22] PCT Filed: Jun. 10, 1988
[86] PCT No.: PCT/EP88/00516
§ 371 Date: Mar. 3, 1989
§ 102(e) Date: Mar. 3, 1989
[87] PCT Pub. No.: WO88/09712
PCT Pub. Date: Dec. 15, 1988

[30] Foreign Application Priority Data

Jun. 12, 1987 [DE] Fed. Rep. of Germany ....... 3719601

[51] Int. Cl.⁵ .................... B32B 31/00; H05B 6/64
[52] U.S. Cl. .................. 156/273.5; 156/275.5; 156/275.7; 219/10.55 M
[58] Field of Search ............... 156/275.5, 273.3, 272.2, 156/275.7, 273.5; 264/22, 25; 219/6.5, 10.43, 10.55 A, 10.55 B, 10.55 F, 10.53, 10.55 M; 296/93

[56] References Cited

U.S. PATENT DOCUMENTS

| | | |
|---|---|---|
| 3,388,945 | 6/1968 | Kevelin .................. 156/275.5 X |
| 3,443,051 | 5/1969 | Pueschner . |
| 3,470,942 | 10/1969 | Fukada .................. 219/10.55 B |
| 3,601,448 | 8/1971 | Stone . |
| 3,867,606 | 2/1975 | Peterson . |
| 3,879,241 | 4/1975 | Butler .................... 156/275.5 X |
| 4,083,901 | 4/1978 | Schonfeld . |
| 4,114,011 | 9/1978 | Stubbs ................. 219/10.55 A X |
| 4,434,345 | 2/1984 | Muscatell ............... 219/10.57 X |
| 4,499,036 | 2/1985 | Hawkes . |
| 4,511,778 | 4/1985 | Takahashi et al. ....... 219/10.55 A |
| 4,626,642 | 12/1986 | Wang et al. ............ 156/272.4 X |
| 4,819,642 | 4/1989 | Anderson et al. ........ 128/419 R |

FOREIGN PATENT DOCUMENTS

| | | |
|---|---|---|
| 88901587 | 2/1988 | European Pat. Off. . |
| 1085625 | 7/1960 | Fed. Rep. of Germany . |
| 2838447 | 8/1979 | Fed. Rep. of Germany . |
| 2041873 | 2/1971 | France . |
| 2358366 | 2/1978 | France . |
| 2500707 | 8/1982 | France . |
| 2508267 | 12/1982 | France . |
| 2002924 | 2/1979 | United Kingdom . |

OTHER PUBLICATIONS

Wilson, T. L., "Dielectric Heating", *Encyclopedia of Polymer Science & Engineering*, vol. 5, pp. 1-23, 1986.
"Microwave Technology", *Encyclopedia of Chemical Technology*, 1981, vol. 15, pp. 494–522.
Decareau, R. V., "Microwave Processing and Engineering", VCH, 1986, pp. 58–61, 162–163, 168–169.

*Primary Examiner*—David A. Simmons
*Assistant Examiner*—Chester T. Barry
*Attorney, Agent, or Firm*—Vincent L. Fabiano; Valerie E. Looper

[57] ABSTRACT

For the at least partial curing of sealants and adhesives in particular in connection with the direct glazing of motor vehicles, at least part of the sealant and adhesive is heated by applying microwave energy.

7 Claims, 12 Drawing Sheets

PROCESS FOR THE AT LEAST PARTIAL CURING OF SEALANTS AND ADHESIVES USING PULSED MICROWAVE ENERGY

The invention relates to a process for the at least partial curing of sealants and adhesives, particularly in connection with the direct glazing of motor vehicles, in which at least part of the sealant and adhesive is heated.

Sealant and adhesive compositions have already been proposed (German patent application P 37 05 427.9), which can be initiated both by heat and moisture, so that they can be set or hardened by brief heating and then subsequently cured by moisture. These are one component polyurethane sealants and adhesives based on telechelic isocyanate prepolymers of aromatic diisocyanates in stoichiometric excess and polyols, which contain a catalyst for moisture initiation and a blocked, heat-activatable cross-linking agent.

The polyurethane prepolymers to be used are prepared in per se known manner from excess aromatic diisocyanate and a polyol. Suitable aromatic diisocyanates are e.g. diphenyl methane diisocyanate (MDI), toluylene diisocyanate (TDI), naphthalene diisocyanate, p-phenylene diisocyanate and 1,3-bis(isocyanate-methyl)-benzene and m or p-tetramethyl xylene diisocyanate (m- or p-TMXDI).

The polyol component can be constituted by polyether polyols, such as polyethylene oxide, polypropylene oxide and copolymers thereof, polyester polyols and hydrofunctional acrylates and methacrylates.

The preferred catalysts for moisture initiation of the aromatic isocyanate prepolymers are tin compounds, such as tin (II) octoate, dibutyl tin laurate and dibutyl tin maleate. It is also possible to use organomercury, lead and bismuth compounds, such as e.g. phenyl mercury acetate or lead naphthenate. Tertiary diamines, e.g. Dabco and cyclic compounds, such as diacabicycloundecene (DBU) or combinations with heavy metals are also suitable.

Suitable blocked, heat-activatable crosslinking agents are complexed amines, particularly the complex compound of methylene dianiline (MDA) and NaCl. The formula of this complex compound is generally given as $(MDA)_3.NaCl$. The compound is available from Uniroyal under the trade name Caytur. By heating to temperatures between 120° and 160° C. thermal decomposition of the complex compound takes place and the liberated methylene dianiline leads to the crosslinking of the polyurethane prepolymer. Normally the MDA complex is used in substoichiometric quantity. Although the brief heating only leads to an incomplete crosslinking, it still gives the system an adequate mechanical initial strength. Complete curing and achieving the final strength is brought about by the reaction of the isocyanate prepolymer with moisture.

Suitable crosslinking agents are also polyamino or polyhydroxy-functional compounds, such as methylene dianiline or polyester polyols, which are microencapsulated and are consequently unavailable at ambient temperature for reacting with the isocyanate prepolymer. Encapsulation can take place in a particularly advantageous manner with the aid of methyl methacrylate or other (meth) acrylates, which only soften at temperatures above 100° C. Even though the polyamino or hydroxy-functional compound is solid at ambient temperature, but softens as from approximately 60° C., heating to temperatures above 100° C. leads to the softening or swelling of the shell or envelope of the microcapsules and therefore to the release of the crosslinking agent. Such crosslinking agents have the advantage that they contain no NaCl or other metal salt.

Such a one-component polyurethane system is characterized by its excellent adhesion to metal and pretreated glass and is therefore particularly suitable for the direct glazing of cars. On adding suitable fillers and rheology aids, the system has an extremely good stability, so that it can be mechanically applied in the desired profile shape to the glass windshields and the like and can be inserted with the same into the vehicle body.

In order to be able to process such heat and moisture-initiating sealants and adhesives in an optimum simple manner during the direct glazing of motor vehicles or also during the manufacture of insulating glass windshields or plates in accordance with the aforementioned process, according to the invention heating takes place by a spatially limited application of microwave energy. With the windshield inserted microwave energy is applied to at least part of the sealant and adhesive, so that a curing of the sealant and adhesive occurs therein which fixes the windshield in its inserted position. This is followed by the complete curing of the sealant and adhesive without energy supply, i.e. by moisture.

It is therefore merely necessary to apply microwave energy to one or more points of the sealant and adhesive, which are preferably at opposite sides, so that in this way the windshield can be reliably fixed by means of the sealant and adhesive in its mounting, so that the sealant and adhesive can then completely cure during the further motor vehicle manufacturing process through moisture and in particular atmospheric moisture.

It is also possible to use a slow curing sealant and adhesive, which is subject to microwave action prior to joining to the windshield. If the thermally activatable component has a lower reactivity, such as e.g. difunctional or trifunctional polyol components, microwave energy can be applied to the complete sealant and adhesive prior to the assembly of the parts to be joined by adhesion.

The use of microwave energy for heating electrically non-conductive materials is known per se and a detailed summary of this technology appears in the work by R. V. Decareau and R. A. Peterson "Microwave Processing and Engineering", VCh Verlagsgesellschaft, 1986. The use of microwaves for curing polyurethane systems is also already known in principle (U.S. Pat. No. 4,083,901). However, in this known process for the use of microwave energy, the substrates to be heated are exposed to the microwave field in large, closed chambers, such as e.g. large furnaces or belt dryers. However, it is not possible to use such processes if sealing and adhesion points are made on large and heavy objects, such as car parts or complete car bodies and only very small areas are exposed to microwave energy compared with the overall dimensions of the component.

The quantity of the microwave energy to be supplied for performing the partial or complete curing process is dependent on various factors, e.g. the viscosity of the sealant and adhesive used, as well as the thickness of the layer to be cured and the greater the viscosity of the sealant and adhesive and the smaller the coating thickness, the greater the microwave energy quantity supplied.

According to a particularly preferred embodiment of the inventive process, the microwave energy is applied in pulse-like manner, a first pulse group being supplied and within this the pulse amplitudes decrease.

As a result of this pulse-like application of the microwave energy, there is initially a relatively high, but brief energy supply, so that part of the sealant and adhesive is significantly heated, without there being any combustion or decomposition phenomena. Between the supply of the first microwave pulse and the supply of the following pulse in the first pulse group, there is consequently a temperature balance within the sealant and adhesive as a result of heat conduction, so that the following pulse does not lead to an overheating of the initially relatively highly heated area of the sealant and adhesive. As a result of the heating which has already taken place through the first pulse and the resulting raised temperature of the sealant and adhesive there is subsequently a supply of a smaller energy quantity, in that microwave pulses with decreasing amplitudes are then applied to the sealant and adhesive.

Following the application of the microwave energy of the first pulse group to the sealant and adhesive the latter has already undergone a certain curing, so that there is a significant rise in its viscosity. For continuing the curing process, a further group of microwave energy pulses can be applied, whose amplitudes decrease from the start to the finish of the group.

Continuous microwave energy can be supplied to the sealant and adhesive between the two pulse groups, so that in this way an increased temperature is maintained and a uniform temperature distribution occurs.

Particularly if the entire microwave energy application is to take place within a relatively short time of e.g. 60 seconds, prior to the first pulse group microwave energy in the form of a single pulse can be applied, whose amplitude and energy content are higher than those of the first pulse of the first pulse group, so that with said first pulse initially a relatively high energy quantity is supplied, but which just fails to bring about a decomposition and/or combustion of the sealant and adhesive, but whereby a significant temperature increase within the entire sealant and adhesive cross-section is brought about by heat conduction during the interval between the single pulse and the first pulse of the first pulse group.

If the inventive process is e.g. to be used in connection with the direct glazing of motor vehicles, then the sealant and adhesive to be cured is conventionally located between the glass windshield to be inserted and a metal frame. For the case of such a joining of a metal part and a non-metallic workpiece, it is appropriate to preheat the metal part in the vicinity of the sealant and adhesive to roughly a temperature of 75° to 100° C. and preferably to between 80° and 95° C., so as in this way to reduce the heat dissipation from the sealant and adhesive in the transition region between the metal part and the sealant and adhesive and in this way the supplied microwave energy essentially acts on the sealant and adhesive.

For performing the inventive process in connection with sealant and adhesive engaging with the windshield, it is possible to use an apparatus in which to the magnetron producing the microwave energy is coupled a microwave conductor, such as a waveguide, from which the microwave energy is supplied to the sealant and adhesive.

For this purpose it is e.g. possible to fit at the waveguide outlet end a radiation element, which can be brought into the immediate vicinity of the sealant and adhesive, so that through corresponding positioning and guidance of the radiation element, the desired spatially limited application of microwave energy to the sealant and adhesive takes place.

It is also possible to secure the radiation element to a robot arm and to move same in controlled manner to the desired points of the sealant and adhesive and adjacent thereto.

The radiation element can e.g. be a radiating dipole, which is laterally surrounded by reflectors, so that it concentrates the microwave radiation radiated by it onto a spatially very closely defined area.

In order to achieve a very effective curing with such a radiating dipole with a minimum energy consumption, the radiating dipole can be faced by a metal element, which can e.g. be part of the vehicle body in the case of the direct glazing of vehicles, but which can in the case of joining two non-metallic components through the adhesive and sealant can also be in the form of an additional metal part. The system comprising the radiating dipole, the components to be joined, the sealant and adhesive and optionally the additional metal part is tuned to the resonant frequency, so that the microwave energy is highly effective.

In another apparatus for performing this process the waveguide can have a square or rectangular cross-section and can have in a wall passage openings for microwave energy, such as is e.g. known in connection with belt dryers in the food industry. The waveguide with its wall having the passage openings can be brought into the immediate vicinity of the sealant and adhesive, so as to bring about the microwave energy application.

In order to ensure that the sealant and adhesive is at least partly cured on opposite sides of the windscreen, two or more such waveguides can be interconnected, so that they have the spacing of facing windscreen edges. The waveguides can in this way be very simply brought to the desired points, so as to bring about at facing sides of the windshield an at least partial curing of the sealant and adhesive by microwave energy application.

It is also possible to fit several conductor elements at the waveguide exit end by means of a coupler and the free ends thereof can be brought into the immediate vicinity of the sealant and adhesive, so that in this way different points of the sealant and adhesive can be simultaneously cured to such an extent that the windscreen is fixed in its fitted position.

In order to apply microwave energy to a slowly curing sealant and adhesive initially not yet joined to the windscreen, it is possible to use an apparatus in which a microwave energy transparent or transmitting tube or hose through which the sealant and adhesive can be passed extends through a cavity exposed to microwave energy action.

The invention is described in greater detail hereinafter relative to embodiments and with reference to the attached drawings, wherein show.

Figure 1:
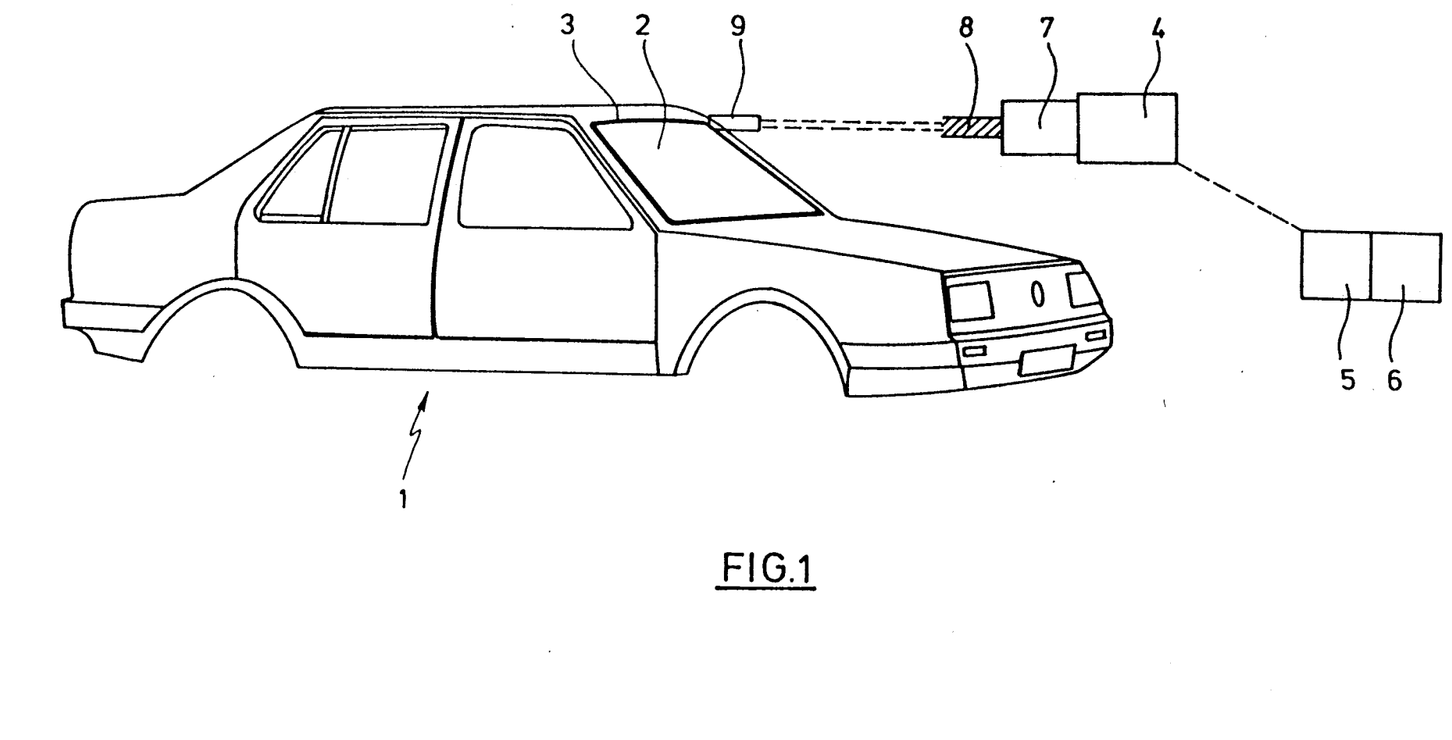
FIG. 1 an apparatus for the application of microwave energy with a radiation element, which is located in the vicinity of the border of a motor vehicle body windscreen inserted by means of a sealant and adhesive.

The apparatus shown in FIG. 1 contains a conventional magnetron 4 for producing microwave energy, which is connected to a power supply means 5 and a control circuit 6. The output circuit of magnetron 4 is connected in conventional manner via a circulator 7 to a waveguide 8, which carries at its free end a radiation element 9, from which the microwave energy can be irradiated into the surrounding area in closely concentrated form.

As shown, the radiation element 9 is close to the upper edge of a wind-screen 2, which is to be mounted in or on a motor vehicle body 1, whilst interposing a heat and moisture-initiating sealant and adhesive 3. Thus, the microwave energy from the radiation element 9 and in part through the microwave-transmitting glass of windscreen 2, can heat the sealant and adhesive in the areas exposed to the microwave energy and can bring about an at least partial curing there.

As is readily apparent, the radiation element 9, e.g. held by a robot arm, can be moved along the entire edge of the windscreen 2, so as to bring about a curing of the sealant and adhesive 3 in this area. However, it is also possible to bring about an only zonal curing by corresponding guidance of the radiation element 9, so that in this way the windscreen 2 is fixed in position with the aid of the sealant and adhesive, whilst the complete curing of the latter subsequently takes place by moisture.

Figure 2:
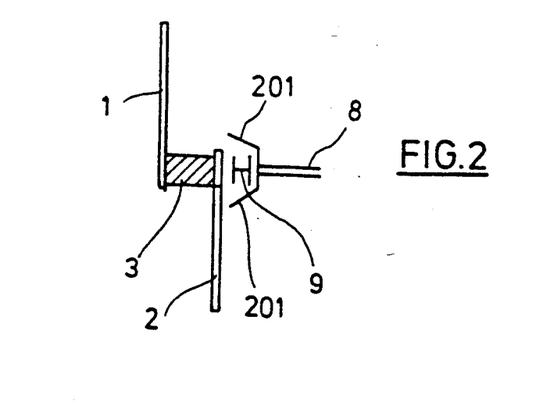
FIG. 2 diagrammatically the use of a dipole element as the radiation element for curing the sealant and adhesive for joining a non-metallic and a metallic component.

As is diagrammatically indicated in FIG. 2, the radiation element 9 can comprise a dipole, to which the microwave energy is supplied by means of the waveguide 8 or a coaxial cable. Laterally of the radiating dipole 9 are provided metal reflectors 201, which prevent a lateral propagation of the microwave energy.

The sealant and adhesive 3 for joining the windscreen 2 to the metal body 1 is located in the vicinity of the radiating dipole 9, windscreen 2 being located between the latter and the sealant and adhesive 3. The thus formed system of radiating dipole 9, glass windscreen 2, sealant and adhesive 3 and metal body 1 is so regulated that there is a resonance drop for the irradiated microwave energy.

If using an arrangement according to FIG. 2 two components 2' (FIG. 3) are to be joined, which are made from a non-metallic material, e.g. plastic or glass, then adjacent to the component 2' remote from the radiating dipole 9 is arranged a metal plate 1' and the system is once again made to resonate, so that the microwave energy is particularly effective.

Figure 4:
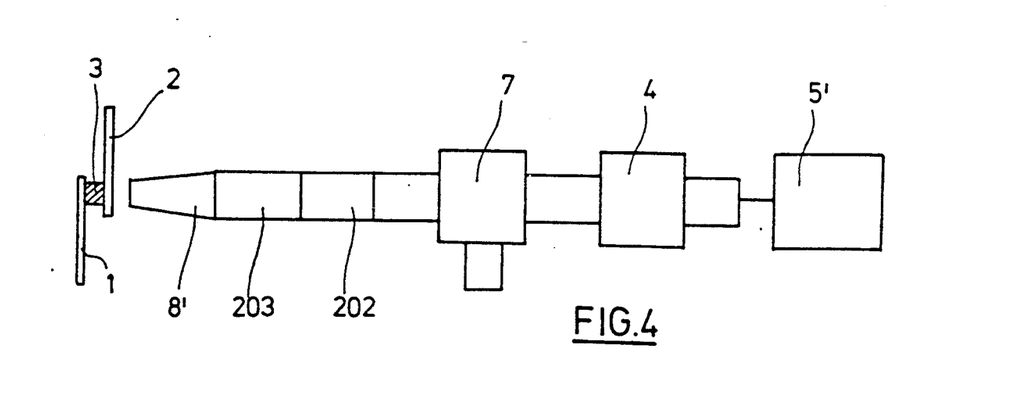
FIG. 4 a construction similar to FIG. 1, in which a tapering waveguide is used as the radiation element.

A corresponding working can also take place with an apparatus, such as is diagrammatically shown in FIG. 4, in which the same components as in FIG. 1 are given the same reference numerals and corresponding components are given the same reference numerals, followed by an apostrophe.

As shown, a locally limited action takes place to a sealant and adhesive 3 located between a glass windscreen 2 and a body part 21 using a waveguide 8', which tapers towards its exit port. The microwave energy is supplied to this waveguide from a magnetron 4 supplied by a power supply means 5 via a circulator 7, a waveguide coupler 202 and a tuner 203.

The tuner 203 used in this apparatus permits by means of adjusting rods projecting into the cavity of waveguide 8', an optimum adaptation for the microwave energy to be irradiated, whilst the tapering of the waveguide 8' taking place in the plane of the drawing from a width of 26 mm to 20 mm takes place in order to bring about a concentration of the microwave energy onto the sealant and adhesive 3.

Figure 5:
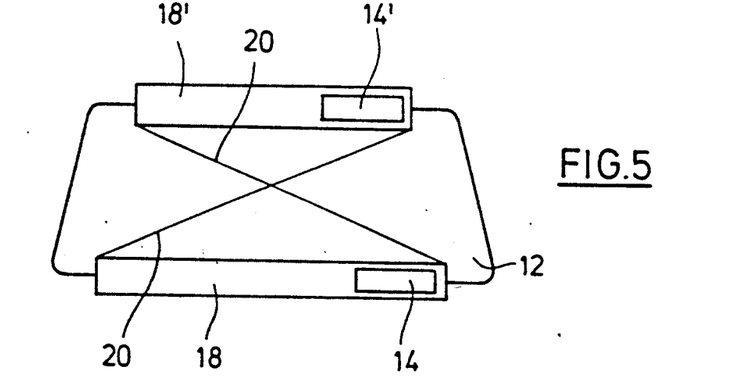
FIG. 5 the position of two microwave energy-radiating, interconnected waveguides with respect to a windscreen.

An at least partial curing of the corresponding sealant and adhesive can also take place with an apparatus of the type diagrammatically shown in FIG. 5. This apparatus contains two waveguides 18, 18' interconnected by struts 20 and on each of these waveguides is mounted a magnetron 14, 14' supplying the same. The spacing of the waveguides 18, 18' is chosen in such a way that their longitudinal axes are located in the vicinity of facing edges of the windscreen 12.

Figure 3:
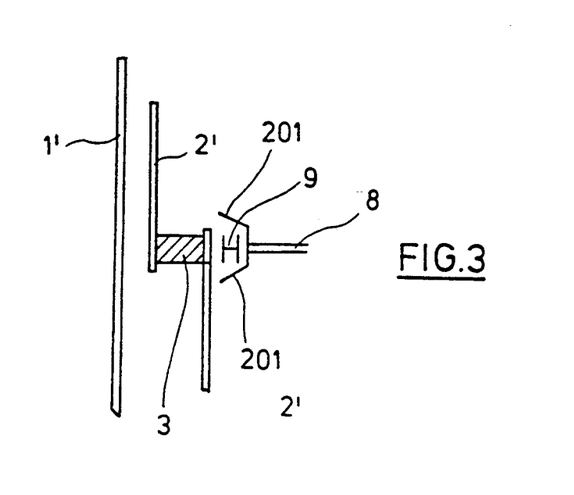
FIG. 3 in a representation corresponding to FIG. 2, an arrangement for joining two non-metallic components by a sealant and adhesive.
Figure 6:
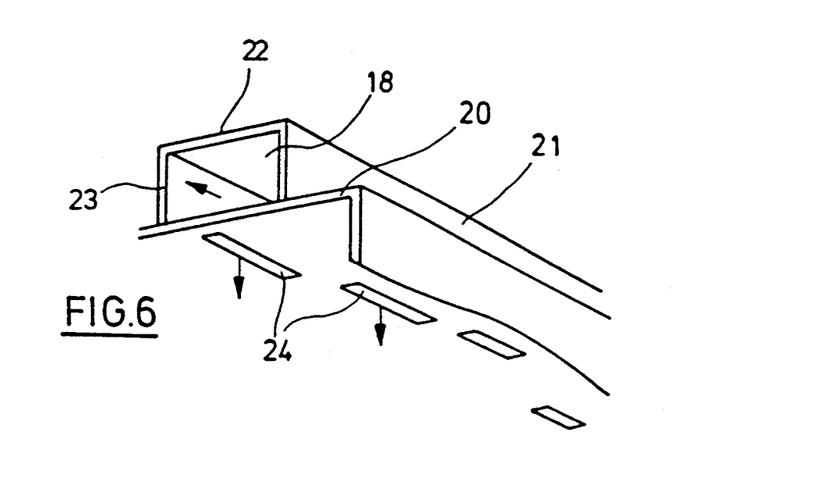
FIG. 6 perspectively the structure of one of the waveguides of FIG. 5.

The waveguides 18, 18' can e.g. be constructed in accordance with the waveguide 18 in FIG. 3, i.e. having a rectangular cross-section with side walls 21, 23, a lower wall 20 and an upper wall 22. The lower wall 20, which in operation faces the windscreen 12 and therefore also the sealant and adhesive to be cured, contains slot-like passage openings 24 running in the direction of the longitudinal axis of the waveguide 18. In operation, the microwave energy is supplied from the magnetron into the waveguide and moves in the direction of its longitudinal axis, as indicated by the arrow in FIG. 6. As a result of the passage openings 24 dimensioned and arranged in known manner, microwave energy passes through the same and in accordance with the direction of the two arrows passes onto the edge region of windscreen 12 and through the same into the sealant and adhesive, as well as into the sealant and adhesive adjacent to the edge of windscreen 12, so that the latter is at least partly cured in the exposed region.

Figure 7:
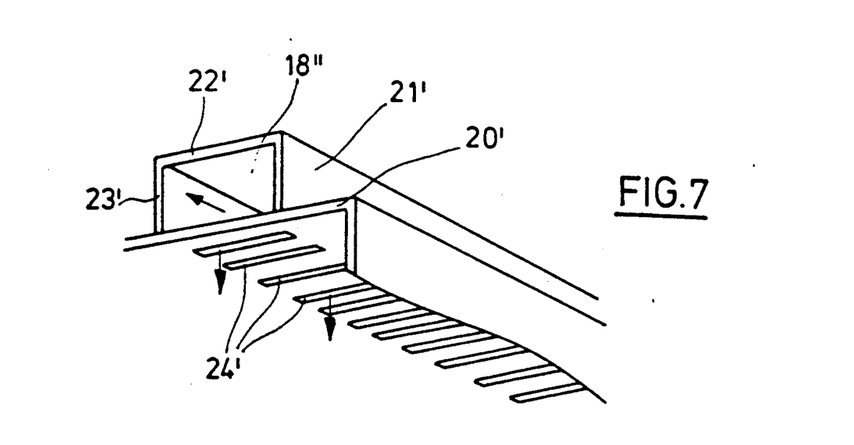
FIG. 7 in a representation corresponding to FIG. 6 a different construction of a waveguide according to FIG. 5.

Another form of the waveguide to be used in the apparatus according to FIG. 5 is shown in FIG. 7. In the case of this waveguide 18'' with side walls 21' and 23', upper wall 22' and lower wall 20', the latter contains slot-like passage openings 24 extending at right angles to the longitudinal axis of waveguide 18'', through which passes microwave energy in the same way as with the openings 24 according to FIG. 3.

Figure 8:
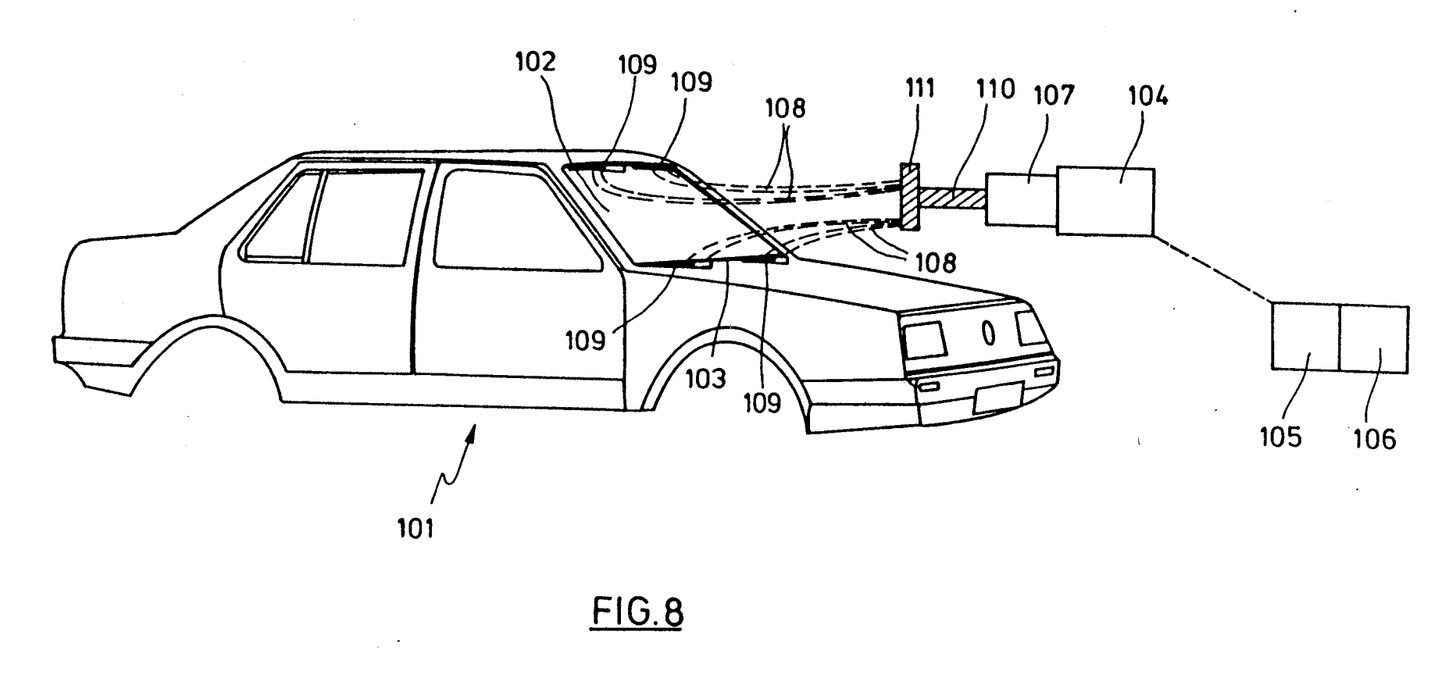
FIG. 8 in a representation corresponding to FIG. 1, an apparatus permitting the simultaneous application of microwave energy to several spaced points of the sealant and adhesive for the windscreen of a motor vehicle.

The apparatus shown in FIG. 8 is similar to that of FIG. 1 and the same parts are given the same reference numerals, but supplemented by 100, so that most of the coinciding parts will not be explained again.

In the case of this apparatus, to the coaxial cable 110 supplied from magnetron 104 via circulator 107 is connected a distributor element 111, from which emanate four conductors 108, such as hollow waveguides and to whose ends are fixed radiation elements 109. By means of said radiation elements, four spaced areas can be simultaneously supplied with microwave energy, so that four areas of the sealant and adhesive 103 located between the body 101 and the windscreen 102 can be cured, so that in this way windscreen 102 is fixed in position.

Figure 9:
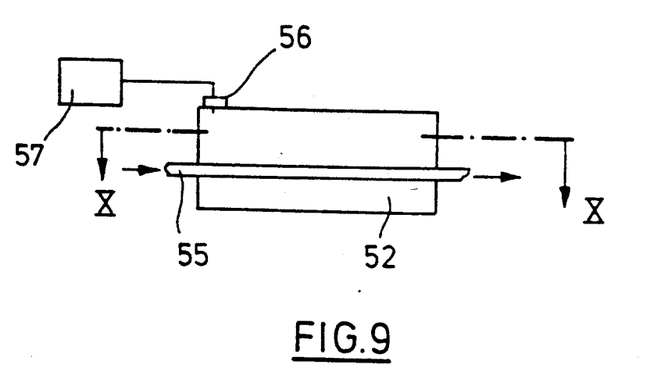
FIG. 9 a fundamental side view of an apparatus with a microwave energy-transmitting hose or tube, which extends through a cavity.
Figure 10:
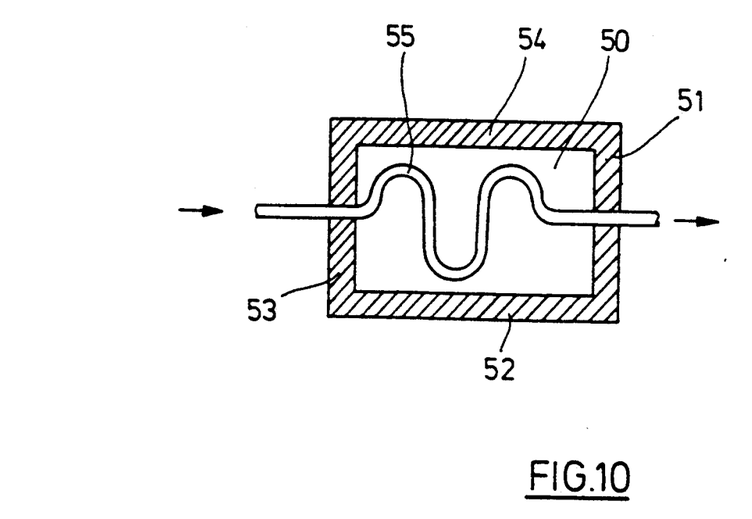
FIG. 10 a section along line X—X of FIG. 9.

An apparatus according to FIGS. 9 and 10 can be used if the sealant and adhesive, which cures slowly on heating, is to be heated prior to insertion in the vehicle body. This apparatus contains a cavity surrounded by walls 51, 52, 53 and 54 through which extends a hose or tube 55, which is transparent to microwave energy. Microwave energy can be fed from a magnetron 57, via a coupler 56 into the cavity 50.

If the sealant and adhesive is drawn through the hose or tube 55, microwave energy is applied to it and it is heated and it can then be used for fixing a windscreen in a vehicle body. In this procedure the curing characteristic must be such that the pot life (permanent processing time) is adequately long to ensure a good wetting during final installation.

The following examples serve to further illustrate the invention. In the graphs according to FIGS. 11 to 17, the time is plotted on the abscissa, the figures indicating half seconds, i.e. the FIG. 40 means 20 seconds, whereas the irradiated microwave energy as a percentage of the maximum transmitting power of the apparatus used is plotted on the ordinate.

It is pointed out in this connection that the amplitudes for the energy appearing in the graphs are only comparable with one another to the extent that they apply to the same apparatus, because through the use of different radiation elements clearly different proportions of the irradiated energy quantities act on the sealant and adhesive to be cured.

EXAMPLE 1

In a test arrangement with a 25 mm × 100 mm × 4 mm glass windscreen and a car coating lacquer-coated sheet steel strip of 25 mm × 100 mm × 1 mm, which have been pretreated with an adhesion-imparting polyurethane primer (TEROSTAT 8510 of Teroson GmbH for the glass side and TEROSTAT 8520 of Teroson GmbH for the metal side) the sealant and adhesive was composed of the following components:

52.44% by weight of polyether diisocyanate (30% plasticizer content)
31.35% by weight of carbon black and calcium carbonate in a weight ratio of 2:1
13.97% by weight of $C_7$-$C_{11}$-phthalate as the plasticizer
0.20% by weight of nickel dibutyl dithiocarbamate
0.04% by weight of dibutyl tin maleate
2.00% by weight of complex compound $(MDA)_3NaCL$ (Caytur supplied by Uniroyal).

This was applied in a range of 25 mm × 5 mm and with a coating thickness of 5 mm. To this test arrangement microwave energy was applied for four minutes by means of an apparatus according to FIG. 4 operating with a frequency of 2.45 GHz and a continuous power output of 500 Watt, the applied microwave energy quantity being adjusted in such a way that there was a complete curing of the sealant and adhesive after this time.

Figure 11:
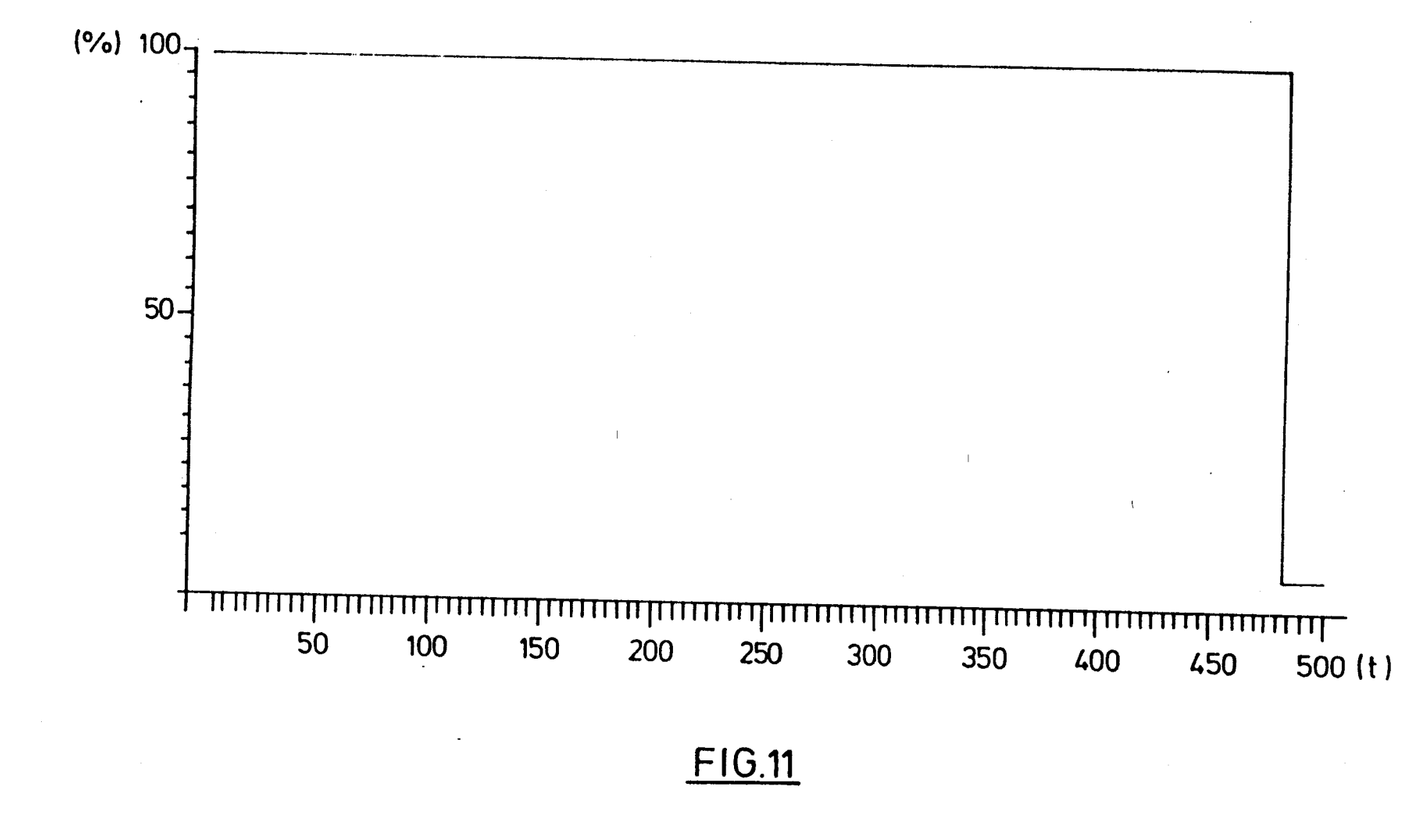
FIGS. 11 to 13 graphs for the microwave energy to be applied to a sealant and adhesive having different viscosities.
Figure 12:
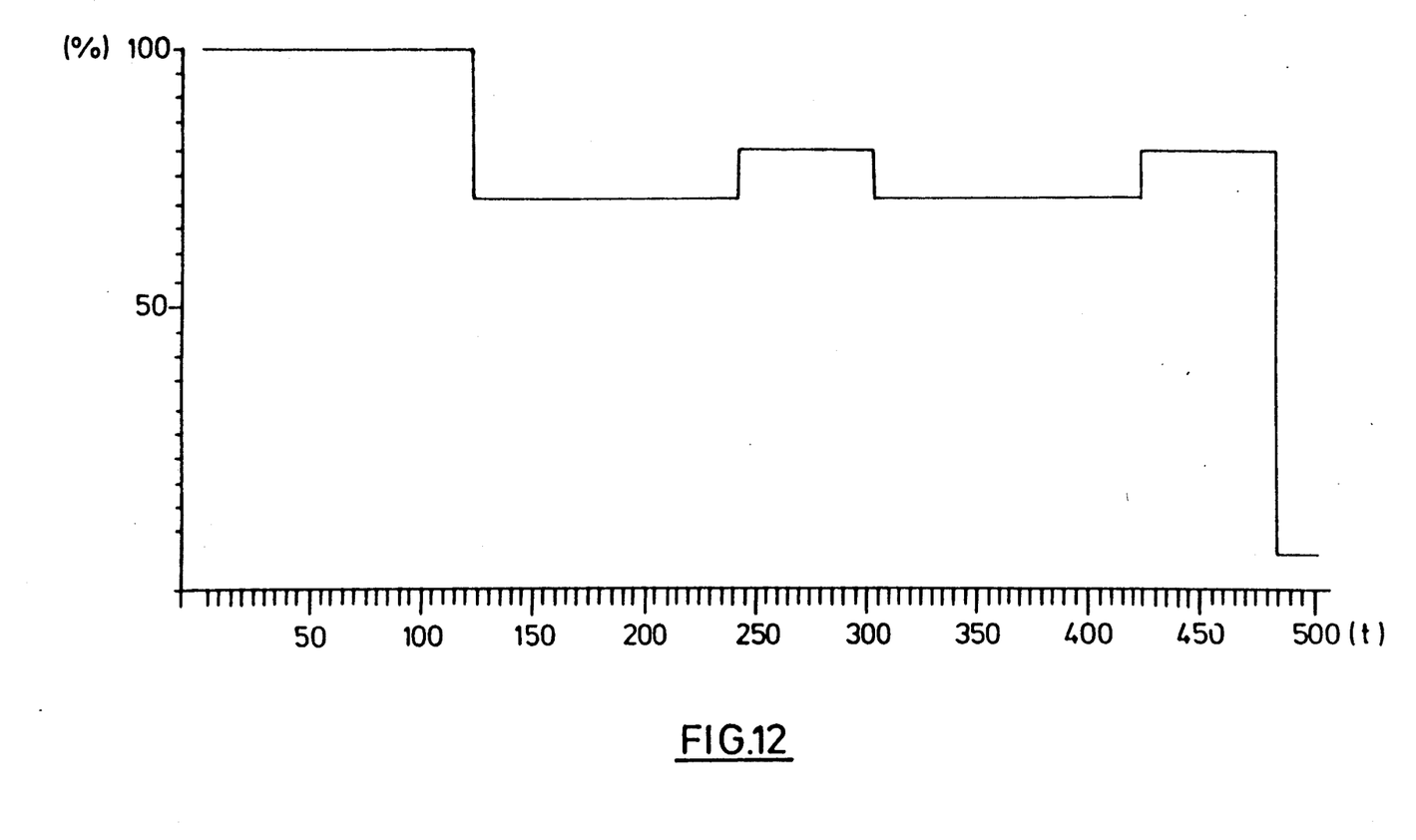
Figure 13:
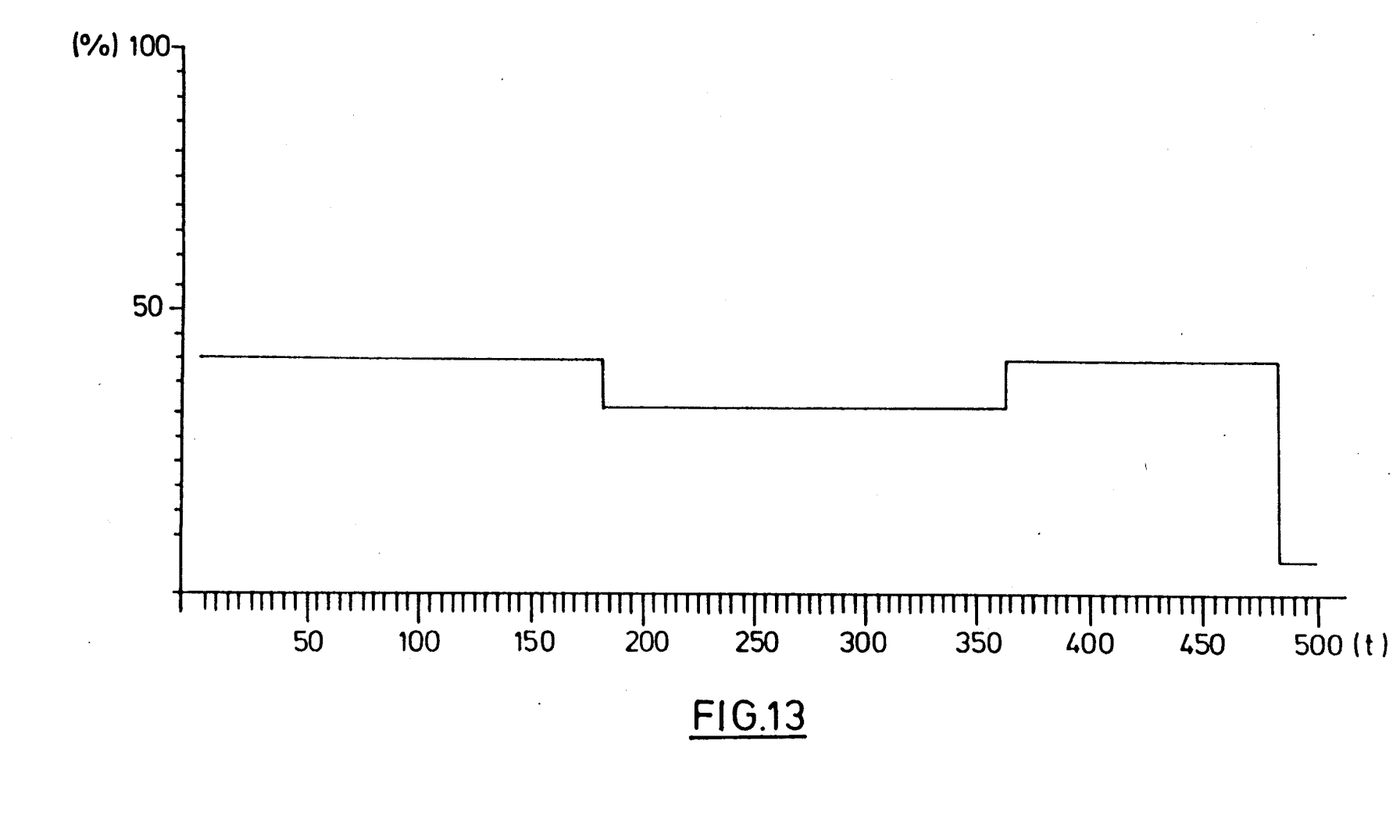

The microwave energy to be applied for the sealant and adhesive used is shown for the different viscosities in FIGS. 11 to 13.

The viscosities of the sealant and adhesive used were measured by determining the so-called injection value, which is the quantity of sealant and adhesive in grammes forced out of a nozzle cartridge with a capacity of 310 ml and a nozzle diameter of 4.5 mm in one minute at a pressure of 4 bar. Thus, the higher the sealant and adhesive viscosity, the lower said injection value.

The viscosity of the sealant and adhesive for the test according to FIG. 11 was 5 g/min, that for the test according to FIG. 12 17 g/min and that for the test according to FIG. 13 38 g/min.

FIGS. 11 to 13 show that the higher the sealant and adhesive viscosity the greater the microwave energy to be applied for curing purposes.

EXAMPLE 2

The test according to FIG. 13 of Example 1 was repeated and in addition the same test was performed with the sole difference of using a coating thickness of 2 mm instead of 5 mm according to FIG. 13.

Figure 14:
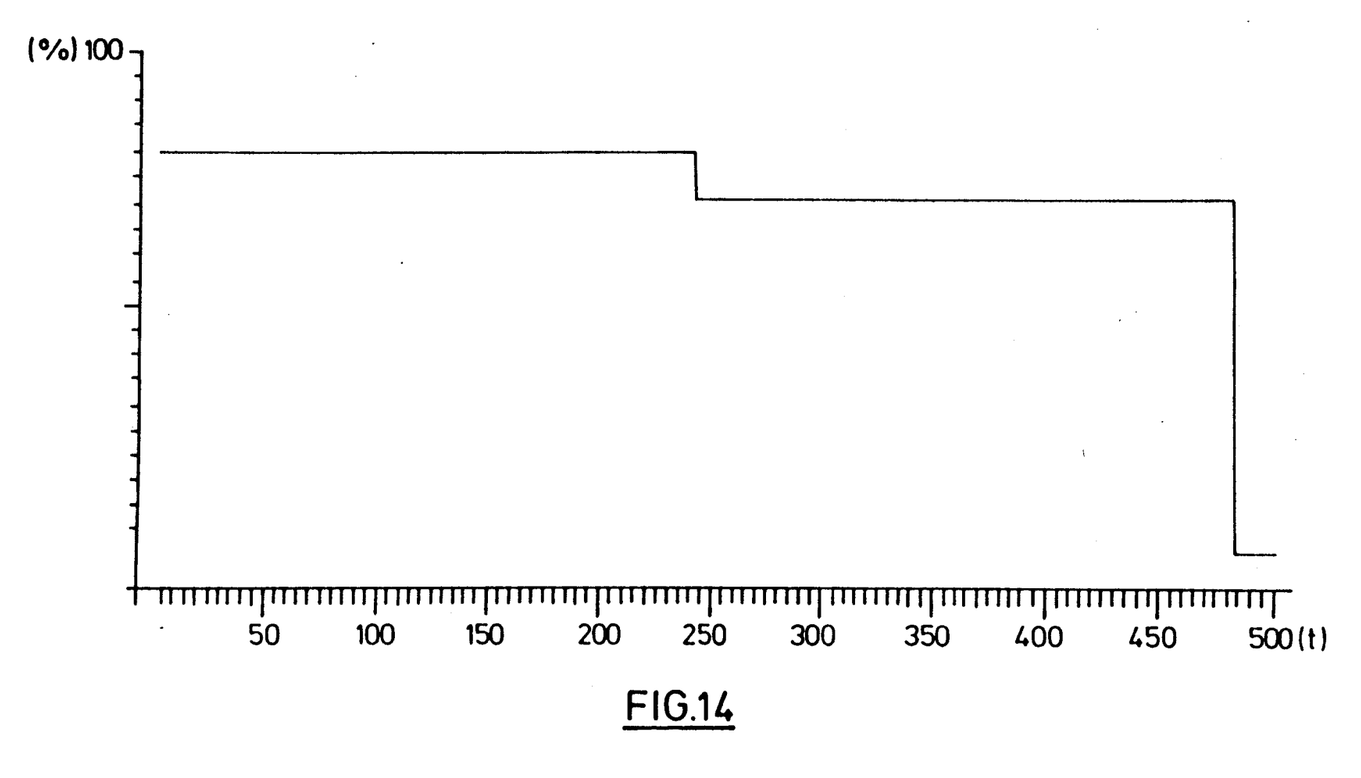
FIG. 14 a graph corresponding to FIGS. 11 to 13 illustrating the necessary microwave energy in the case of a smaller sealant and adhesive coating thickness.

The result of the latter test is shown in FIG. 14, which makes it clear that on reducing the coating thickness from 5 mm according to FIG. 13 to 2 mm according to FIG. 14, a much greater microwave energy quantity must be applied to cure the sealant and adhesive.

EXAMPLE 3

The same test arrangement as in Examples 1 and 2 was used, but with different coating thicknesses and with an apparatus for applying microwave energy of the type shown in FIG. 2. This apparatus had a rated output of 500 watt and operated with a microwave radiation frequency of 2.45 GHz.

The irradiation of microwave energy took place for 270 seconds and in an essentially pulse-like manner, the energy supply being controlled in such a way that the sealant and adhesive had cured following the test period of 270 seconds.

Figure 15:
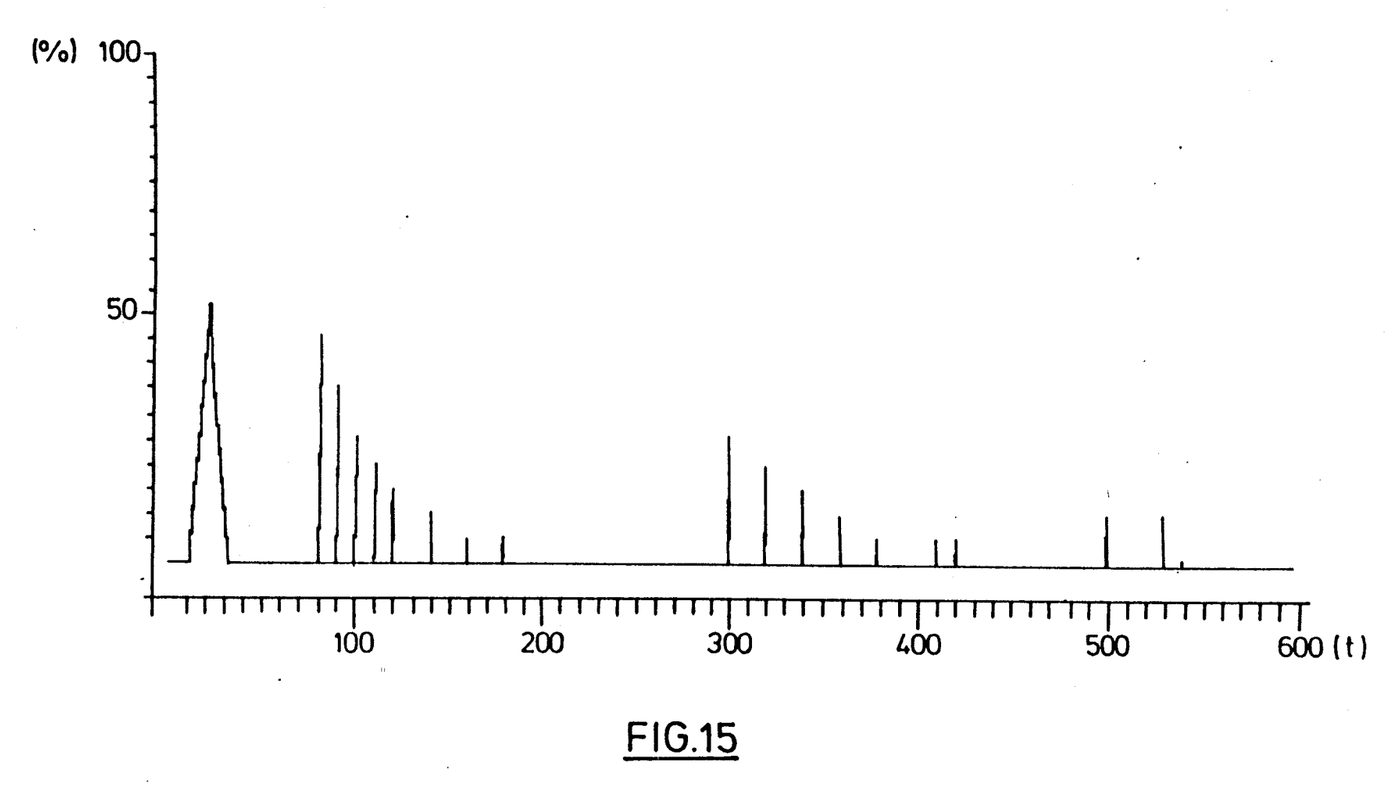
FIGS. 15 to 17 graphs of the pulse-like application of microwave energy.
Figure 16:
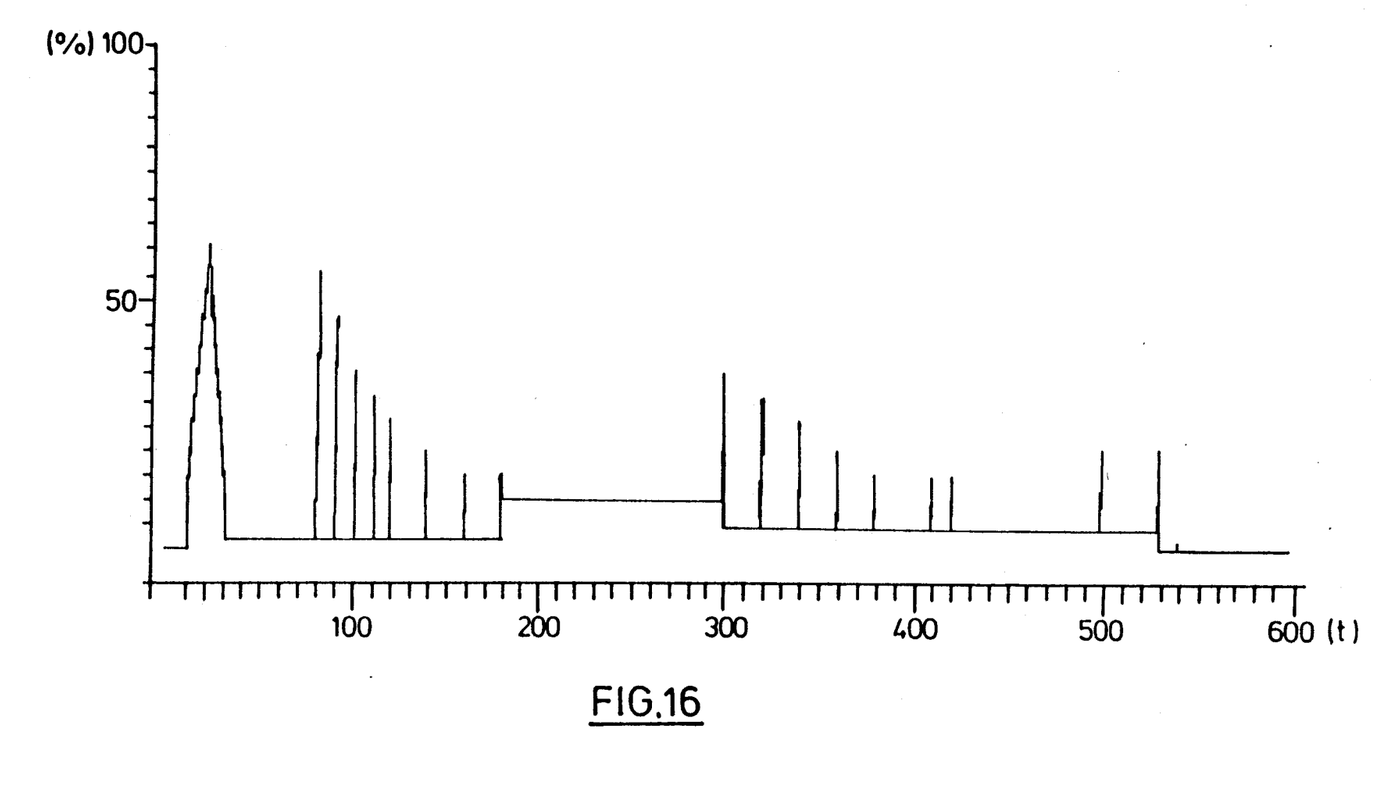

As can be gathered from FIGS. 15 and 16, initially a relatively high pulse was supplied and then after an interval of approximately 50 seconds a first pulse group was applied, whose first pulse had a smaller amplitude and contained a smaller energy quantity than the first applied pulse and whose pulses having identical pulse widths have gradually decreasing amplitudes. Following a longer interval used in the test according to FIG. 16 for the continuous supply of a relatively small energy quantity, a second pulse group was applied, whose pulses had a smaller magnitude and a greater spacing from one another than the pulses of the first pulse group and whose pulse amplitudes gradually decreased.

In the test according to FIG. 15, the sealant and adhesive was used with a coating thickness of 4 to 5 mm, whilst in the test according to FIG. 16 it had a coating thickness of 2 to 3 mm and it is clear that a higher energy quantity had to be applied for the smaller coating thickness.

EXAMPLE 4

A test arrangement according to that of FIG. 15 was used with a sealant and adhesive coating thickness of 5 mm and using a pulse-like irradiation with microwave energy using an apparatus according to FIG. 2 for a period of 60 seconds, in order to completely cure the sealant and adhesive.

Figure 17:
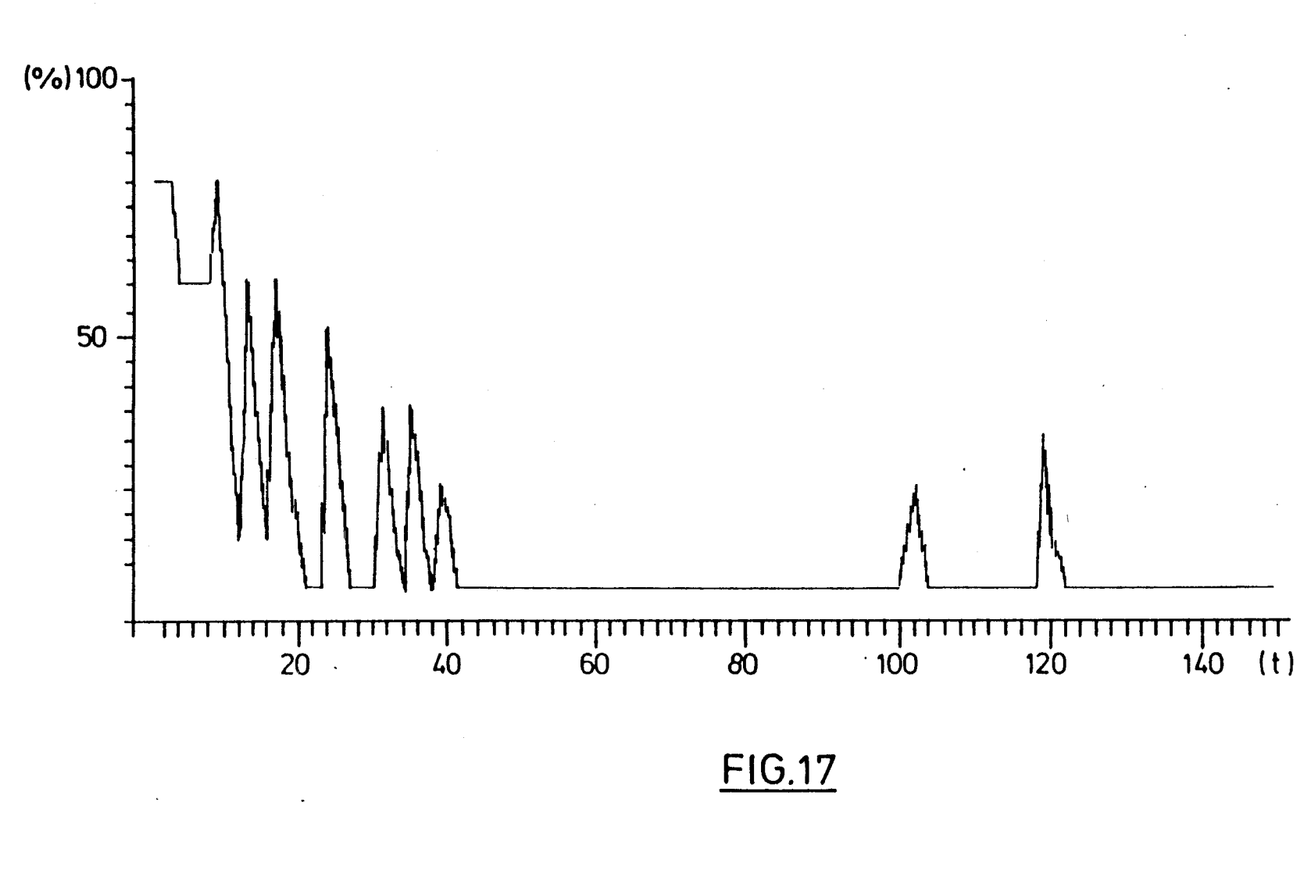

The microwave energy to be applied in this case can be gathered from the graph according to FIG. 17.

We claim:

1. A process for glazing motor vehicles, the steps comprising: applying a sealant and adhesive composition to either a vehicle frame having one or more metal elements or to a window, inserting the window into the frame adjacent to the metal element, applying microwave energy from a radiational element located to one side of the window opposite the metal element to at least a portion of the composition in a pulse-like manner so that overheating of the portion of the composition to which the microwaves are applied is avoided, so as to heat and initiate curing of at least a portion of the composition, thereby securing the window to the frame wherein the pulse-like manner is that a first group of microwaves is applied during an initial period, followed by an interval period during which continuous microwave energy is applied, and subsequently at least one additional group of microwaves is applied during at least one additional period.

2. The process of claim 1, wherein the first group of microwaves has an initial amplitude, and each additional group of microwaves has an amplitude less than the initial amplitude.

3. The process of claim 1, wherein the period during which each additional group of microwaves is applied has the same length.

4. The process of claim 1, wherein the sealant and adhesive composition is slow curing and microwave energy is applied to the composition before the window is inserted into the frame.

5. The process of claim 1, wherein the metal element is preheated in the vicinity of the sealant and adhesive composition.

6. The process of claim 5, wherein the metal element is heated to a temperature of about 75° to 100° C.

7. The process of claim 5, wherein the metal element is heated to a temperature of about 80° to 95° C.

* * * * *